Patented June 5, 1934

1,961,251

UNITED STATES PATENT OFFICE 1,961,251

REDUCTION OF VISCOSITY OF CELLULOSE ACETATE

Virgil B. Sease, Parlin, N. J., assignor to E. I. du Pont de Nemours & Company, Wilmington, Del., a corporation of Delaware No Drawing. Application August 21, 1928, Serial No. 301,154

6 Claims. (Cl. 260—102)

This invention is directed to a process of controlling the viscosity characteristics of cellulose esters, and to the novel products thereby obtainable.

One object in particular is to obtain cellulose acetate having new properties and within broad limits to afford control so as to obtain such an extent of those characteristics as may be selected for given special purposes.

The objects of this invention include also a correlation of the conditions under which this cellulose acetate is produced, and in particular the conditions of time, temperature and water content affecting hydration. Specifically there is contemplated the preparation of cellulose acetate such that it is soluble in acetone with a viscosity of the order of 15 centipoises, and upward to 700 centipoises, referred to a 10% solution under standard conditions.

A further object is to control the treatment of cellulose acetate so that subsequent solutions thereof, while having a relatively low viscosity, yet will permit the preparation of lacquers and enamels having relatively high cellulose acetate content.

Throughout this specification reference will be made for the purpose of brevity solely to cellulose acetate by way of example. However, it will be understood that limitations and restrictions are not to be implied thereby, but that the features of control herein disclosed may be extended to such equivalent cellulose esters of other acids as fairly may come within the scope of the claims appended.

It is known in the art that the viscosity of cellulose acetate solutions may be regulated, and this has been attempted by the application of ultra violet light. As distinguished from such regulation, the control disclosed in this application has to do with the factors usually met in the preparation of the acetate. It is known also that the degree of its solubility in various solvents may, in a measure, be controlled by selecting certain specific conditions during its production. This invention, however, is distinguished therefrom by obtaining low viscosity with the product rather than a control of solubility, and this result is obtained by such a correlation of factors as has not heretofore been discovered.

The preparation of cellulose acetate may be considered as occurring in two stages, (a) acetylation of the cellulose to a given degree, and (b) subsequent partial hydrolysis of the cellulose acetate. This invention discloses that by obtaining the proper relation of the variables of temperature, time, water and sulphuric acid, where the usual hydrolysis treatment is pursued, the viscosity of the hydrated cellulose acetate in solvents is controllable at will within a much wider range than has been disclosed hitherto.

Cellulose, for example, tissue paper, purified fiber, or cotton linters is acetylated by any of the well known methods. The Sease process (U. S. Patent No. 1,546,679), which involves a preliminary soaking in acetic acid and acetic anhydride is preferred. This is because the Sease process results in less hydrolytic splitting of the molecule before or during the acetylation. Hydrolytic splitting at that time yields more brittle films ultimately than where the hydrolysis is confined to the controlled conditions of the subsequent step. But while it is preferable to conduct the acetylating stage in this manner, this invention is not necessarily restricted thereto and may follow any given acetylating procedure. It is a feature of this invention, however, to conduct the acetylating step at a temperature of at least 30° C.

The discoveries herein disclosed are that for obtaining low viscosity cellulose acetate there must be such control during the hydrolytic converting step that a very small amount of water is present while at the same time a relatively high temperature is employed. Further, that there is a tendency for the viscosity to fall to a minimum and then to rise as time advances. And that as the amount of sulphuric acid is increased relatively to the cellulose acetate there is also an increase of viscosity.

To effect the hydrolytic conversion according to this invention the usual procedure is carried out by heating the cellulose acetate with glacial acetic acid, acetic anhydride and sulphuric acid, or their equivalents until the desired viscosity is secured. But the water content is to be restricted to less than 35 parts water to 100 parts original cellulose, and especially low viscosity will result with not more than 10 parts water. The temperature during this time will be raised relatively high, at least above 30° C. and preferably 50°–70° C.

As a measure of the characteristics of this improved cellulose acetate, it is convenient to refer to the product dissolved in acetone, and to measure the viscosity in centipoises at 28° C. As a relative basis, it may be stated that a 11.78% nitrocellulose solution in acetone may be said to have a viscosity of 750 centipoises, while by this invention a cellulose acetate solution of 11.78% in acetone would have a viscosity of below 100 centipoises, or even down to about 15 centipoises.

The new process for making low viscosity cellulose acetate may be illustrated, but not restricted, by the following specific examples:

Example I

Acetylation 100 parts by weight of air dried purified cotton linters of the sort commonly used for the preparation of cellulose nitrate were soaked in a mixture of equal parts of acetic anhydride and glacial acetic acid for 16 hours at about 25° C., and then pressed to leave about 400 parts of the solution in the fibers. After this preliminary treatment they were then introduced into an acetylating bath which in this case contained in addition to the liquid retained in the fibers:

| | Parts |
|---|---|
| Glacial acetic acid | 400 |
| Acetic anhydride | 50 |
| Concentrated sulphuric acid | 10 |

The mixture was stirred vigorously for 4 hours at about 30° C. A clear viscous solution was obtained.

Hydrolysis

To this acetylating bath containing the cellulose acetate was added the following mixture:

| | Parts |
|---|---|
| Water | 30 |
| Glacial acetic acid | 200 |
| Concentrated sulphuric acid (96%) | 10 |

After thorough mixing, the temperature was raised to 65° C. and maintained at that point for 2¼ hours. The time of adding the hydrolyzed mixture was ½ hour and the time required to raise the temperature to 65° C. was ½ hour.

The cellulose acetate was then precipitated as a fine powder by pouring into water, washed by boiling with several changes of water until substantially neutral, and air dried.

The final product was readily soluble in acetone, and gave a viscosity at 28° C. of a 10% solution in c. p. acetone of 19 centipoises.

Example II

This is varied from Example I only by a hydrolyzing mixture of the following composition:

| | Parts |
|---|---|
| Water | 10 |
| Glacial acetic acid | 200 |
| Concentrated sulphuric acid (96%) | 10 |

The hydrolyzing temperature was 70° C., and the time of adding the hydrolyzing mixture was ½ hour, time to reach 70° C., 1¼ hours, and held at 70° C. 1½ hours. The viscosity under the above conditions of measurement was 16.7 centipoises.

With relative parts of sulphuric acid of 10, 20 and 30 to 100 parts of cellulose the viscosities were below 100 centipoises at development of solubility in acetone, when hydrolyzing at 50° C. with 10 parts of water.

With this new cellulose acetate, it is within the scope of this invention to combine pigments or gums, plasticizing agents and other and additional solvents to yield films that upon drying in two or three coats will be hard, durable, tough and adhesive. The spraying viscosity will have been brought down so that a film sufficiently thick for protective purposes will be deposited by spraying in three coats, as contrasted with the four or five coats and loss of considerable volatile solvent previously necessitated. This invention permits the preparation of solutions of such high cellulose acetate while maintaining viscosities within the demands of spraying methods of application.

For a suitable lacquer the relative ratios of ingredients may be varied widely, but in general the non-volatile materials should comprise cellulose acetate, a resin, and a usual softening agent for cellulose acetate.

Adapting this improved cellulose acetate to a lacquer, the following will present a preferred composition:

Example III

| | Parts by weight |
|---|---|
| Low viscosity cellulose acetate | 12 |
| Dibutyl tartrate | 6 |
| Elemi | 3 |
| Monomethyl ether of ethylene glycol | 33 |
| Toluol | 27 |
| Acetone oil (75°–115° C.) | 15 |
| Diacetone alcohol | 4 |
| | 100 |

Further, this cellulose acetate will permit the addition of a proper thinner to such lacquer to adapt it to spraying. A preferred thinner for such lacquer as above would be:

| | Parts by weight |
|---|---|
| Denatured ethyl alcohol | 12 |
| Ethyl acetate | 12 |
| Toluol | 36 |
| Acetone oil | 20 |
| Monomethyl ether of ethylene glycol | 20 |
| | 100 |

The properties of this new modification of cellulose acetate also permit its extension to the preparation of enamels.

Example IV

| | Parts by weight |
|---|---|
| Lacquer given in Example III | 100 |
| Pigment | 9 |
| | 109 |

The amount of pigment will depend on the nature of the pigment and the purpose for which the enamel will be used. When light colored pigments of low hiding power are used, such as zinc oxid, as much as 30 parts of pigment may be desirable, while as little as two parts may be sufficient in the case of carbon black. In general an enamel of the type given should contain 5 to 10 parts of pigment to be desirable on outdoor exposures. The pigment may be incorporated by any of the well known methods. It will be noted that the new modified cellulose acetate is one of extremely low viscosity characteristics, yet these above results are obtainable with it to extend the field of usefulness of these products beyond what now is obtainable with the restrictions inherent with cellulose nitrate. Plastics similarly may be prepared, and high solid ratios maintained.

It will be readily understood that the term "solvent" is employed as is customary in this art and not with any restrictive theoretical definition of the term.

I claim:

1. The process of preparing a low viscosity cellulose acetate comprising acetylating cellulose at at least 30° C. and then hydrolyzing at 50-70° C. for about 3¼ hours with a water ratio to original cellulose of substantially 10-100 and a sulphuric acid ratio to original cellulose of substantially 20-100.

2. The process of preparing a low viscosity cellulose acetate comprising acetylating cellulose at at least 30° C., then hydrolyzing at 30-70° C. with a water ratio to original cellulose of less than 35-100 and a sulphuric acid ratio to original cellulose of 10-30 to 100, and stopping said hydrolyzing step before solubility of the cellulose acetate in acetone begins to substantially decrease.

3. A cellulose acetate having a viscosity of the order of 15 centipoises at 10% concentration in c. p. acetone at 28° C., said cellulose acetate being obtainable by the acetylation of cellulose at at least 30° C. and subsequent hydrolysis at 50-70° C. for about 3¼ hours with a water ratio to original cellulose of substantially 10-100 and a sulfuric acid ratio to original cellulose of substantially 20-100.

4. A cellulose acetate having a viscosity of the order of 15 centipoises at 10% concentration in c. p. acetone at 28° C., said cellulose acetate being obtainable by the acetylation of cellulose at at least 30° C. and subsequent hydrolysis at 30-70° C. with a water ratio to original cellulose of less than 35-100 and a sulfuric acid ratio to original cellulose of 10-30 to 100, said hydrolysis being stopped before the solubility of the cellulose acetate in acetone begins substantially to decrease.

5. A composition comprising a cellulose acetate having a viscosity of the order of 15 centipoises at 10% concentration in c. p. acetone at 28° C., said cellulose acetate being obtainable by the acetylation of cellulose at at least 30° C. and subsequent hydrolysis at 50-70° C. for about 3¼ hours with a water ratio to original cellulose of substantially 10-100 and a sulfuric acid ratio to original cellulose of substantially 20-100.

6. A composition comprising a cellulose acetate having a viscosity of the order of 15 centipoises at 10% concentration in c. p. acetone at 28° C., said cellulose acetate being obtainable by the acetylation of cellulose at at least 30° C. and subsequent hydrolysis at 30-70° C. with a water ratio to original cellulose of less than 35-100 and a sulfuric acid ratio to original cellulose of 10-30 to 100, said hydrolysis being stopped before the solubility of the cellulose acetate in acetone begins substantially to decrease.

VIRGIL B. SEASE.